United States Patent [19]

Hecht

[11] Patent Number: 4,751,659

[45] Date of Patent: Jun. 14, 1988

[54] DEFECT COMPENSATION FOR DISCRETE IMAGE BARS

[75] Inventor: David L. Hecht, Palo Alto, Calif.

[73] Assignee: Xerox Corporation, Stamford, Conn.

[21] Appl. No.: 89,480

[22] Filed: Aug. 26, 1987

[51] Int. Cl.$^4$ .......................................... G01D 15/06
[52] U.S. Cl. ..................................... 364/518; 346/154
[58] Field of Search ........................ 364/518; 346/154;
358/294, 293; 250/556, 271, 555, 551, 566, 568;
371/7, 9, 31, 36

[56] References Cited

U.S. PATENT DOCUMENTS

| | | | |
|---|---|---|---|
| 4,318,135 | 3/1982 | Allis et al. | 358/294 |
| 4,367,925 | 1/1983 | Sprague et al. | 350/355 |
| 4,396,252 | 8/1983 | Turner | 350/355 |
| 4,450,459 | 5/1984 | Turner et al. | 346/160 |
| 4,488,808 | 12/1984 | Kato | 250/556 |
| 4,509,058 | 4/1985 | Fischbeck | 346/1.1 |
| 4,547,896 | 10/1985 | Ohrombe et al. | 250/556 |
| 4,673,953 | 6/1987 | Hecht | 346/108 |

*Primary Examiner*—Arthur G. Evans

[57] ABSTRACT

A discrete image bar having defective pixel generators redundantly addresses all pixel positions within an address space to produce an essentially defect free image. To that end, the footprint of the pixel generators of the image bar is shifted back and forth across an integer number of pixel positions widthwise of the address space as a function of time, and the input data for the image bar is synchronously countershifted in the opposite direction across an equal number of pixel generators, thereby sequentially bringing at least two different pixel generators into imaging alignment with each pixel position, without materially affecting the address space alignment of the input data. All of the defective pixel generators of the image bar are disabled, so the input data for them are shifted onto non-defective pixel generators after a suitable time delay, whereby the image corresponding to this shifted data is superimposed, sequentially in time, on the image corresponding to the unshifted data for the non-defective pixel generators. These partial images are recorded on a suitable recording medium, thereby causing them to incoherently spatially sum with each other to create an essentially defect free image of the spatial pattern represented by the input data.

17 Claims, 10 Drawing Sheets

DEFECT COMPENSATION FOR DISCRETE IMAGE BARS

FIELD OF INVENTION

This invention relates to discrete image bars and, more particularly, to methods and means for compensating for defects among the individual picture element ("pixel") generators of such devices.

BACKGROUND OF THE INVENTION

As a matter of definition, an "optical image bar" comprises an array of optical pixel emitters or pixel control elements (collectively referred to hereinafter as "pixel generators") for converting a spatial pattern, which usually is represented by the information content of electrical input signals, into a corresponding optical exposure pattern. Although there are a variety of applications for these devices in several different fields, a significant portion of the effort and expense that have been devoted to their development has been directed toward their application to electrophotographic printing, where they may prove to be a relatively low cost and reliable alternative to the flying spot raster scanners which have dominated that field since its inception. Optical displays and optical memories may also benefit from the use of these image bars, but those applications are of secondary interest at this time.

Optical image bars have spatially distinct pixel generators, so they belong to a broader class of devices, which will be referred to herein as "discrete image bars" to provide a term of sufficient breadth to cover electomechanical devices having similar characteristics. For example, there are multi-stylii impact and electrostatographic printheads, as well as multinozzle ink jet arrays, which are embraced by the term "discrete image bar" as used herein.

Image bars embodying EO TIR (electrooptic total internal reflection) spatial light modulators are particularly interesting, so the more detailed aspects of this disclosure are directed toward them. In keeping with the teachings of a commonly assigned U.S. Pat. No. 4,396,252 of W. D. Turner, which issued Aug. 2, 1983 on "Proximity Coupled Electro-Optic Devices," such a modulator characteristically has a plurality of parallel, individually addressable electrodes which are supported on or closely adjacent a reflective surface of an optically transparent electrooptic (EO) element, such as a lithium niobate ($LiNbO_3$) crystal. Typically, the electrodes are longitudinally aligned with the optical axis of the modulator and are laterally distributed widthwise of the EO element on generally equidistant centers.

To operate such a modulator, substantially the full width of its EO element is illuminated by a tranversely collimated light beam. This sheet-like light beam is incident on the EO element at a near grazing angle of incidence with respect to its aforementioned reflective surface, so the light beam totally internally reflects from that surface while propagating through the EO element. For modulating the light beam, voltage values representing input data samples (e.g., the pixel values for a given line of an image) are applied to the invidually addressable electrodes of the modulator, thereby producing corresponding fringe electric fields. These localized fringe fields penetrate into the EO element, so they locally vary its refractive index. As a result, the phase front and, in some embodiments, the polarization of the light beam are spatially modulated in accordance with the input data sample values as the light beam propagates through the EO element. Typically, the light beam is brought to a wedge shaped focus on the reflective surface of the EO element to increase the efficiency of the electrooptic interaction. Moreover, the voltage values of the input data samples generally vary as a function of time, such as in accordance with the pixel patterns for successive lines of a two dimensional image, so the modulation imposed on the light beam usually is a time dependent function.

For image bar applications of EO TIR spatial light modulators, prior proposals generally have prescribed Schlieren imaging optics for imaging or "reading out" the modulator onto its output image plane. The frequency plane filtering of a Schlieren imaging system effectively transforms the spatially modulated output radiation of the modulator into a corresponding intensity distribution, but there are embodiments in which a polarization analyzer may be used alone or in combination with a Schlieren stop to perform that function. Thus, as a matter of definition, the term "electrooptic image bar" refers to all image bars which embody electrooptic spatial light modulators, regardless of whether the modulators are read out by spatial filtering and/or by polarization filtering. Indeed, the broader aspects of this invention may be applied to other types of "optical image bars," such as to light emitting diode (LED) arrays, and even to non-optical "discrete image bars," such as the aforementioned electro-mechanical printheads and ink jet arrays. For that reason, a hierarchy of descriptors (i.e., in increasing order of specificity, "discrete," "optical," "electrooptic" and "EO TIR") are used herein to define the term "image bar" with varying degrees of breadth.

There have been several significant developments which have reduced the cost and increased the reliability of EO TIR spatial light modulators. Among the more noteworthy improvements for image bar applications of there devices are a "differential encoding" technique that is described in a commonly assigned U.S. Pat. No. 4,450,459 of W. D. Turner et al., which issued May 22, 1984 on "Differential Encoding for Fringe Field Response Electro-Optic Line Printers," and an electrical interconnect strategy that is described in a commonly assigned U.S. Pat. No. 4,367,925 of R. A. Sprague et al., which issued Jan. 11, 1983 on "Integrated Electronics for Proximity Coupled Electro-Optic Devices." Briefly, it has been shown that the number of electrodes which such a modulator requires can be reduced by a factor of almost two, without sacrificing imaging resolution, if the input data samples are differentially encoded on a line-by-line basis prior to being applied to the modulator. Furthermore, it has been demonstrated that more or less conventional VLSI circuit technology can be employed to integrate the modulator electrodes with their addressing and drive electronics, thereby facilitating the orderly and reliable distribution of data samples to the relatively large number of electrodes which ordinarily are required for reasonably high resolution imaging.

Experience suggests that the manufacturing yield of high resolution EO TIR spatial light modulators could be increased if provision were made to compensate for the localized defects which these devices occasionally exhibit. Open circuited electrodes and inter-electrode short circuits are two of the more common defects that affect such modulators. Unfortunately, these electrical defects seldom can be ignored in practice because they caused a localized loss of modulation control and, therefore, tend to produce readily observable image defects.

Of course, other discrete image bars may suffer from similar imperfections. For example, LED image bars may include faulty emitters, ink jet arrays may contain unreliable nozzles, and matrix configured stylus arrays may have defective stylii. Therefore, even though the primary emphasis of this invention is on relieving the defect tolerance specification for EO TIR image bars, it will be evident that the broader aspects of the invention may be employed to increase the yield and/or improve the performance of other types of discrete image bars. The principal requirement for application of this invention is that the defective pixel generators of the image bar are capable of being disabled, so that the imaging errors they produce can be corrected by overwriting them utilizing other, non-defective pixel generators. Pixel generators which fail in an enabled or "on state" usually are intolerable because they tend to produce "hard" or uncorrectable imaging errors. For that reason, a "defective pixel generator" is hereby defined as being a permanently disabled pixel generator.

As will be understood, a pixel generator may be "permanently disabled" electrically or mechanically, including by means of an opaque mask in the case of an optical pixel generator. Moreover, the defective pixel generators of an image bar may be identified through the use of a pre-test procedure performed, for example, while the image bar is going through final inspection, or they may detected dynamically by more or less routinely examining the image output of the image bar to identify any pixel generators which cease to function properly during operation.

A favored implementation of this invention involves a two step imaging process which may be employed to compensate for defective pixel generators located anywhere on a discrete image bar, provided that the image bar is designed to have a sufficient number of extra pixel generators (as more fully described hereinbelow) to achieve redundant addressing of all pixel positions across the full width of an imaging field of the image bar as a result of a single step shift in the lateral positioning of its pixel generators relative to its imaging field. Excessively large numbers of neighboring or near neighboring defective pixel generators are incompatible with this two step process because of the limited number of extra pixel generators that are available, but the number of extra pixel generators may be increased or decreased more or less at will while the image bar is being designed.

SUMMARY OF THE INVENTION

In accordance with the present invention, a discrete image bar having defective pixel generators redundantly addresses all pixel positions within an address space to produce an essentially defect free image. To that end, the pixel generators of the image bar are shifted back and forth across an integer number of pixel positions widthwise of the address space as a function of time, and the input data for the image bar is synchronously countershifted in the opposite direction across an equal number of pixel generators, thereby sequentially bringing at least two different pixel generators into imaging alignment with each pixel position, without materially affecting the address space alignment of the input data. All of the defective pixel generators of the image bar are disabled, so the input data for them are shifted onto non-defective pixel generators after a suitable time delay, whereby the image corresponding to this shifted data is superimposed, sequentially in time, on the image corresponding to the unshifted data for the non-defective pixel generators. These partial images are recorded on a suitable recording medium, thereby causing them to incoherently spatially sum with each other to create an essentially defect free image of the spatial pattern represented by the input data. In display applications, the human eye may perform the function of the "recording medium".

A two step imaging process may be employed to carry out the defect compensation technique of this invention. To achieve redundant addressing of all pixel positions while employing such a process, an oversized image bar having extra pixel generators outboard of its nominal address space-wide imaging field is employed, thereby enabling some or all of these extra pixel generators to be shifted into alignment with pixel positions at one side of its imaging field while an equal number of pixel generators are being shifted out of the imaging field at its opposite side. Pixel rewrites can be avoided during a two step process by logically separating the input data for the image bar into two mutually exclusive subsets, one of which contains data enroute to the non-defective pixel generators of the image bar and the other of which contains data enroute to its defective pixel generators. These two data subsets are sequentially applied to the image bar prior to and after the pixel generators and the data are shifted and countershifted, respectively, such that the image bar sequentially produces a pair of mutually exclusive partial images which combine to define a substantially defect free image.

If desired, the defect compensation technique of the present invention may be applied to image bars which interleave odd and even numbered pixels for increased output resolution. Indeed, the apparatus disclosed in a copending and commonly assigned United States patent application of David L. Hecht, which was filed May 13, 1985 under Ser. No. 733,354 on "Discrete Optical Image Bars Having Enhanced Spatial Addressing Capacity" may be modified relatively easily and inexpensively to apply this invention to optical image bars. Odd and even numbered data samples are supplied for such an image bar in alternating time sequence, so those two groups of samples may be separately processed to provide defect compensation. Also, provision may be made in line printers and the like to compensate for the cross-scan or sagittal motion of the recording medium relative to the image bar, thereby causing the pixels for each line of an image to substantially align with each other, despite their time staggered generation.

BRIEF DESCRIPTION OF THE DRAWINGS

Still other features and advantages of this invention will become apparent when the following detailed description is read in conjunction with the attached drawings, in which.

DETAILED DESCRIPTION OF THE ILLUSTRATED EMBODIMENTS

While the invention is described is some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

Figure 1:
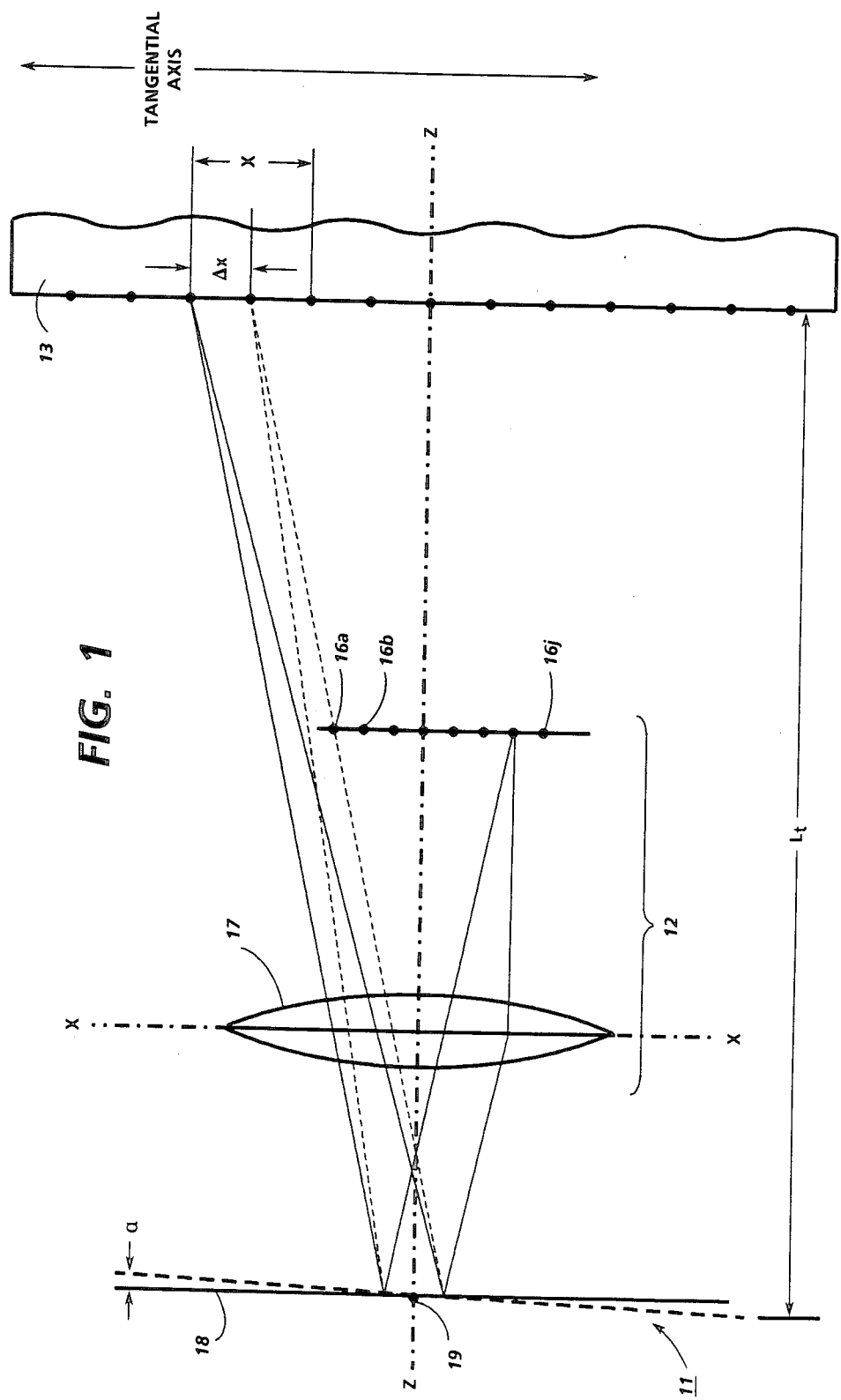
FIG. 1 is a schematic tangential plane view of a line printer embodying a defect compensated optical image bar in accordance with the present invention.
Figure 2:
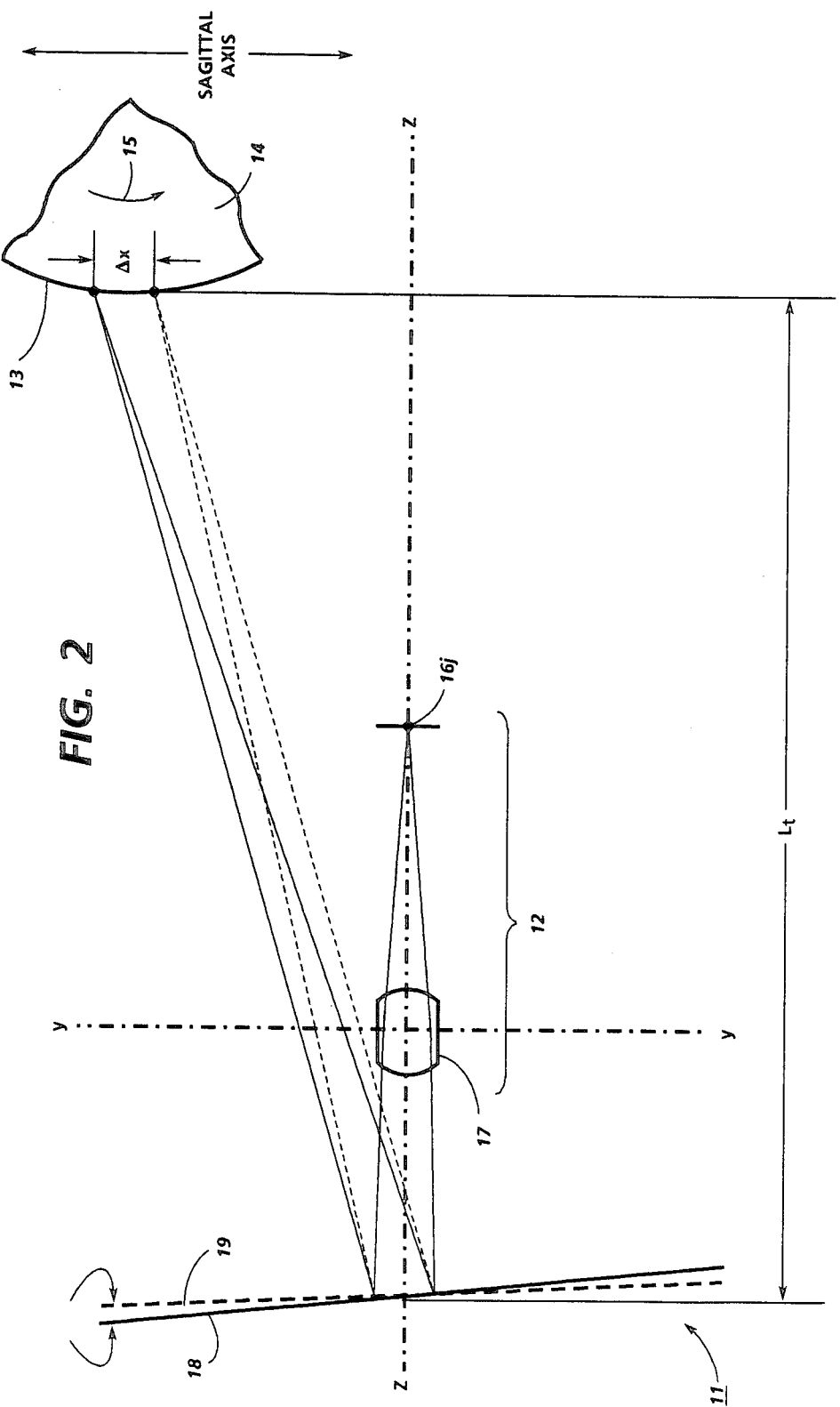
FIG. 2 is a schematic sagittal plane view of the line printer shown in FIG. 1.

Turning now to the drawings, and at this point especially to FIGS. 1 and 2, there is an electrophotographic line printer 11 having an optical image bar 12 for printing an image on a photosensitive recording medium 13. As shown, the recording medium 13 is a photoconductively coated drum 14 which is rotated during operation (by means not shown) in the direction of the arrow 15 (FIG. 2). However, there are other xerographic and nonxerographic recording media which could be used, including photoconductively coated belts and plates, as well as photosensitive films and coated papers. The recording medium 13, therefore, generally represents a photosensitive medium which is exposed while advancing across an image plane in a cross-line or sagittal direction relative to the image bar 12.

The image bar 12 comprises a plurality of discrete pixel generators $16a-16i$ which are displaced from each other in a tangential direction (i.e., laterally) on more or less equidistant centers. An imaging lens 17 images the image bar 12 onto the recording medium 13 with a predetermined magnification, and an optical deflector, such as a galvo driven mirror 18, laterally shifts the image or "optical footprint" of the image bar 12 from side-to-side with respect to the recording medium 13 as a function of time. A similar arrangement is described in my aforementioned United States patent application on "Discrete Optical Image Bars Having Enhanced Spatial Addressing Capacity," so it will become apparent that this invention may be employed not only to provide defect compensation for the image bar 12, but also to permit interlacing of pixel patterns, such as the odd and even numbered pixels for the successive lines of an image, to increase the spatial addressing capacity of the image bar 12.

As shown in FIGS. 1 and 2, the imaging lens 17 is optically aligned between the image bar 12 and the mirror 18 for imaging the image bar 12 onto the recording medium 13. The mirror 18, in turn is m ounted for rotary oscillation through a predetermined angle, $\alpha$, about an axis 19 which is approximately perpendicular to the optical or Z-axis of the image bar 12 in the tangential plane (FIG. 1), but tilted at a small fixed angle, $\phi$, with respect to the Y-axis of the image bar 12 in the sagittal plane (FIG. 2). Accordingly, the oscillation of the mirror 18 tangentially deflects the optical footprint of the image bar 12 from side-to-side with respect to the recording medium 13 as a function of time, while the sagittal tilt of the mirror 18 sagittally offsets the deflection plane from the imaging lens 17.

Although a pre-deflection imaging system is shown, it will be understood that a post-deflection imaging system could be used. Moreover, it will become apparent that provision may be made to compensate for the cross-line or sagittal motion of the recording medium 13 with respect to the image bar 12, even though this simplified embodiment does not deal with that issue.

In operation, data are applied (by means not shown) to some or all of the pixel generators $16a-16i$ of the image bar 12, thereby selectively enabling and disabling them to produce an optical field distribution (i.e., a pattern of light) which, ideally, is spatially modulated in accordance with the data. If, however, the image bar 12 has an defective pixel generators which map onto pixel positions in its output image field, the modulation may not faithfully represent the data. It, therefore, will be understood that this invention is directed to the non-idealized case, where it is desired to compensate for the image defects caused by using of an image bar 12 having one or more defective pixel generators.

To carry out the present invention, the image bar 12 is tested prior to and/or during operation to identify its defective and non-defective pixel generators. This test data suitably is employed to produce a binary bitmap, B, comprising a string of ordered bits which indicate whether the image bar output, while occupying any one of a plurality of different lateral positions relative to a full line length wide address space, is or is not capable of writing a pixel in any given address ("pixel position") located anywhere within that address space. For cases in which the footprint of the image bar 12 does not completely fill the full line length width of the address space, bits representing implicit defects are appended to one or both of ends the bitmap to extend it. Logically, these implicit defects are equivalent to the explicit defects associated with the defective pixel generators of the image bar 12, so the bitmap is constructed by assigning one logic level, for example, a high ("1") level, to bits representing either implicit or explicit defects, and an opposite or low ("0") logic level to bits representing the non-defective pixel generators of the image bar 12.

Binary words, $B_1$–$B_n$, of predetermined bit length are selected from the bitmap, B, for describing the mapping of the non-defective and defective pixel generators, as well as the implicit defects, of the image bar 12 onto the pixel positions within the line length address space for each different lateral position of the image bar 12 relative to the address space. The bit length of the words, $B_1$–$B_n$, is equal to the nominal number of pixel positions (i.e., non-interleaved addresses) within the address space, so they provide basic line length descriptions of the mapping which occurs while the image bar 12 is in its different lateral positions with respect to the address space. For selecting the words $B_1-B_n$ from the bitmap B, a pointer suitably is set to the word, $B_1$, describing the mapping that occurs when the image bar 12 is in its initial or "home" position, whereby the word describing the mapping that occurs whenever the image bar is translated in one direction or the other by a given whole number of pixel positions is obtained by shifting the pointer an equal number of bit positions in the same direction with respect to the bitmap B.

In keeping with this invention, to compensate for imaging defects caused by the defective pixel generators of the image bar 12, its pixel generators 16a–16i are shifted back and forth laterally with respect to the recording medium 13 as a function of time in accordance with a stepping pattern which translates them across a whole number of pixel positions on each step, and the input data for the image bar 12 is synchronously countershifted in the opposite direction across an equal number of pixel generators. The stepping pattern is selected so that each pixel position which is initially masked by a defective pixel generator is subsequently addressed by a non-defective pixel generator. As will be seen, a two step per line imaging process is feasible if the footprint of image bar 12 substantially fills or overfills the address space. If, however, the image bar underfills the address space, additional steps may be added to the imaging process to provide margin-to-margin redundant addressing of all pixel positions within the address space, e.g., by first shifting the image bar in one direction and by then shifting it in the opposite direction.

If the input data for the image bar 12 is stored for retrieval while the imaging process is being completed, the input data and the pixel generators 16a–16i of the image bar 12 can be sychronously countershifted equally and oppositely with respect to the recording medium 13 (i.e., the address space) as a function of time, thereby causing the image bar 12 to produce a more or less defect-free image of the data. As will be appreciated, the pixel generators 16a–16i are realigned with the address space as a result of being shifted, and this realignment enables the non-defective pixel generators to address pixel positions which were masked by defective pixel generators when the image bar was in its initial or home position. The synchronous countershift of the input data relative to the pixel generators 16a–16i, in turn, ensures that the resignation of the data relative to the address space is substantially constant. Alternatively, a pair of independent data sets may be applied to the image bar 12 in alternating sequence synchronously with the successive steps of a two step imaging process, and the defect may may then be employed to discriminate between the images written in response to those two data sets.

While the preceding overview emphasizes the breadth and flexibility of the present invention, its underlying principles will be even better understood after reviewing a few practical examples in further detail. For that reason, the following examples primarily relate to two step imaging for defect compensation, with and without pixel interlace and with and without sagittal compensation.

Figure 3:
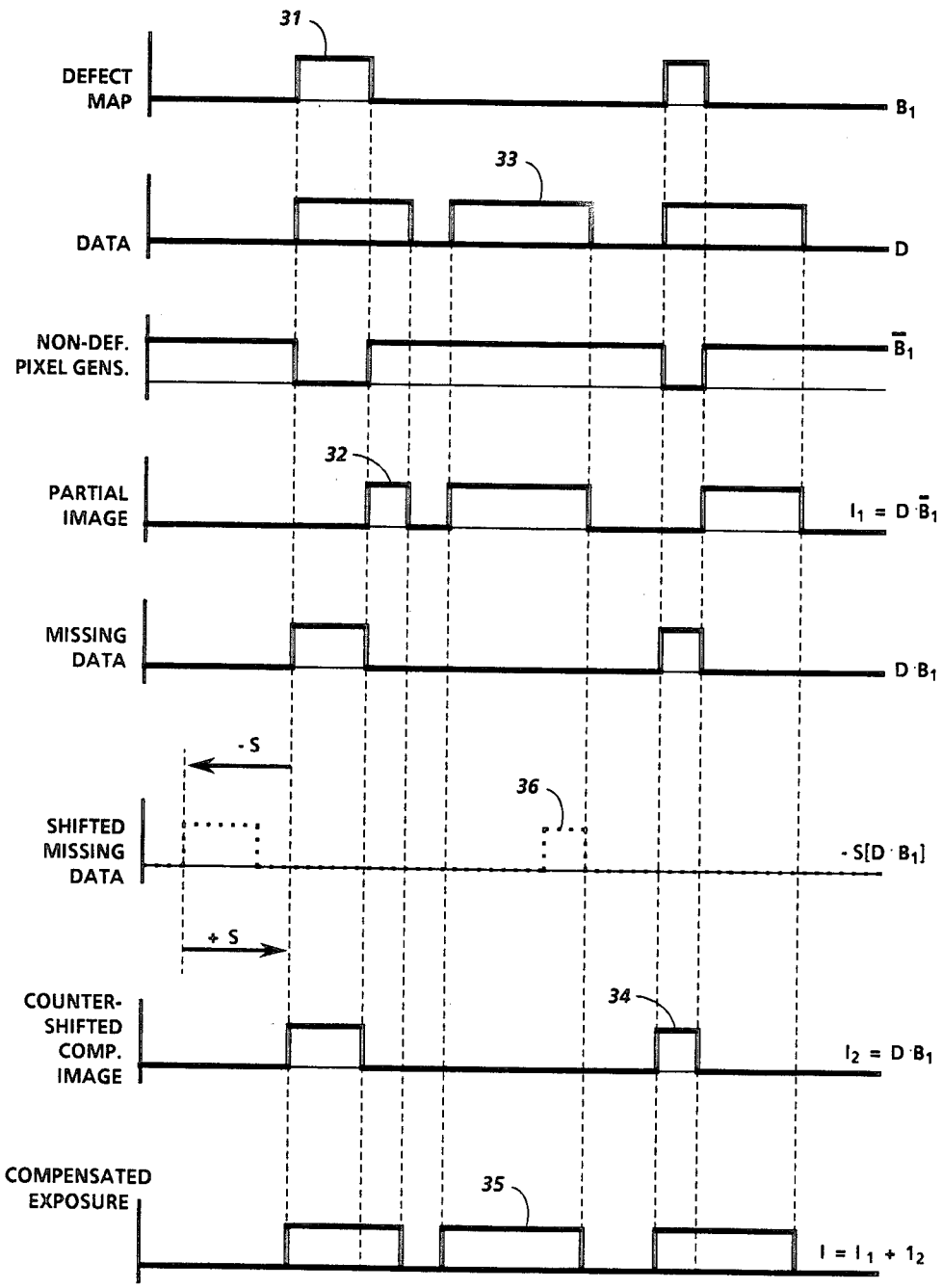
FIG. 3 is an imaging diagram which illustrates the basic operating principles of the present invention.

Relatively straightforward input data storage and processing means (an example of which is described hereinbelow) enable the simplified line printer of FIGS. 1 and 2 to perform the basic two step imaging process which is illustrated in FIG. 3, without pixel interlace or sagittal compensation. For illustrative purposes, it has been assumed that some of the pixel generators of the image bar 12 are defective, so they superimpose a masking pattern 31 on the output image 32 which the image bar 12 generates in response to its input data ("D") 33, thereby impairing the imaging fidelity of the image bar 12.

In keeping with this invention, to compensate for the imaging defects caused by defective pixel generators, provision is made for causing the image bar 12 to superimpose at least one compensating image 34 on the recording medium 13, sequentially in time with respect to the image 32, whereby the compensating image 34 incoherently sums with the partial image 32 to construct a compensated exposure pattern 35 which is more or less defect free. When a two step image process is employed, a single compensating image 34 supplies all of the pixels which the defective pixel generators mask out of the image 32. To enable the image bar 12 to generate such a comprehensive compensating image 34, the input data for its defective pixel generators is shifted tangentially, as indicated at 36, in a predetermined direction by an amount selected to re-map that portion of the data onto non-defective pixel generators. The steps of the imaging process are sequential so the shifted data 36 is applied to the image bar 12 either immediately before or immediately after (as in FIG. 4) the image 32 is generated. Moreover, the oscillation of the mirror 18 is time synchronized with the imaging process, so that the footprint of the image bar 12 is equally and oppositely countershifted with respect to the recording medium 13 while the compensating image 34 is being recorded, thereby providing substantial lateral or tangential alignment of the images 32 and 34 on the recording medium 13. Of course, other means could be used to shift the image, including, for example, chromatic dispersion of wavelength switched images. See a copending and commonly assigned U.S. patent application of D. L. Hecht, which was filed May 13, 1985 under Ser. No. 733,356 on "Variable Wavelength Discrete Optical Image Bars Having Passively Enhanced Spatial Addressing Capacities".

The aforementioned defect map B is a useful tool for selecting an appropriate shift, S, for re-mapping non-defective pixel generators of the image bar 12 onto the pixel addresses which are masked by defective pixel generators when the image bar is in its home position. As will be recalled, opposite logic levels are assigned to the individual bits of the defect map, B, to discriminate between the defective and non-defective pixel generators of the image bar 12. As a result, a BIT AND or a BIT NAND process may be employed for determining the magnitude and direction of the appropriate shift, S, of the pixel generators. More particularly, if the defective and non-defective pixel generators of the image bar 12 are identified by high ("1") and low ("0") logic level bits, respectively, a single compensating image 34 is sufficient to overwrite all of the imaging errors caused by the defective pixel generators, provided that the shift, S, of the pixel generators 16a–16i with respect to the address space is selected so that:

$$[B_1] \cdot [B_2] = [0] \qquad (1)$$

where:

$B_1$ = fixed length binary word representing the spatial mapping of non-defective and defective pixel generators of the image bar 12 onto the addressable pixel positions within a line length address space when the image bar 12 is in its home position;

$B_2$ = another binary word of equal length representing the spatial mapping of non-defective and defective pixel generators of the image bar 12 onto the aforesaid pixel positions when the output of the image bar 12 is laterally shifted a selected whole number, S, of pixel positions from its home positions; and · signifies the BIT AND function.

For example, if the defect map, B, for the image bar 12 is . . . 000000001 1001000000 . . . , and if the address space is twelve bits wide (an abnormally small number, but sufficient for illustrative purposes) with $B_1$ determined to be:

$$[B_1] = [000011001000] \quad (2)$$

equation (1) confirms that S suitably is selected to be a shift of +2(+ and − denote shifts to the right and left, respectively), so that $$[B_2] = [000000110010] \quad (3)$$

with the result that:

$$[B_1] \cdot [B_2] = [000000000000] \quad (4)$$

Although equation (1) does not necessarily yield a unique solution, it describes a systematic approach for determining whether a given shift, S, will enable a two step imaging process to achieve comprehensive defect compensation or not. Indeed, there may be several solutions to equation (1), so a recommended approach is to increase the shift S until a valid solution is found.

If desired, a similar technique may be used to select a sequence of shifts, $S_1, S_2, \ldots S_m$ for a serial image compensation process, such that:

$$[B_1] \cdot [B_2] \cdot [B_3] \cdot \ldots \cdot [B_n] = 0 \quad (5)$$

where each $B_j$ (j=0, 1 . . . M) characterizes the image bar 12 with its output shifted by $S_j$ pixel positions from its home position.

This provides a generalization of the above-described two step imaging process to allow for a n step process.

Figure 4:
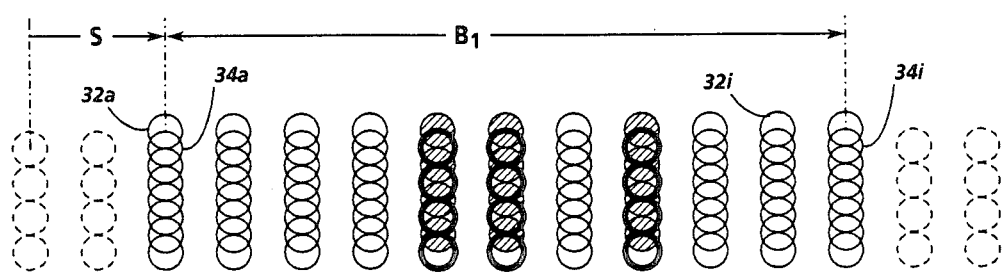
FIG. 4 is a pixel mapping pattern for a simple defect compensated image bar.

As shown in FIG. 4, the images 32 and 34 expose the recording medium 13 to complementary representations of the data 33 because the active and suppressed (i.e., inactive) pixels 34a–34i of the image 34 laterally align with the inactive (i.e., "dead" or disabled) and active pixels 32a–32i, respectively, of the image 32, and vice-versa. The inactive pixels of the image 32 are shaded and the active pixels of the image 34 are boldly outlined to illustrate the manner in which the images 32 and 34 incoherently sum with each other on the recording medium 13. The pixels which the images 32 and 34 contribute to the resultant exposure pattern 36 (i.e., their active pixels) are on generally equidistant centers laterally, but they are sagittally displaced from each other because of the cross scan motion of the recording medium 13 relative to the image bar 12. As will be seen, provision may be made to compensate for this sagittal misalignment. Concentrating for now on the embodiment shown in FIGS. 1 and 2, it will be evident that the angle, α, through which the mirror 18 is oscillated about its axis 19 and the rate of such oscillation are dependent upon the magnitude and sense of the selected shift, S (FIG. 3) and the line printing rate of the image bar 12, respectively. More particularly, the rate at which the mirror 18 is oscillated is selected to equal the rate at which data for successive lines of an image are applied to the image 12. The angle, α, on the other hand, is selected to cause the rotation of the mirror 18 to equally and oppositely countershift the footprint of the image bar 12 as the data is being shifted back and forth along the image bar 12. The angle, $α_o$, through which the mirror 18 must be rotated for a single pixel shift of the image bar footprint is given to a first approximation by:

$$α_o \simeq X/2L_t \quad (6)$$

where:

X = the "nominal" (i.e., non-interleaved) pixel pitch; and $L_t$ = the length of the optical arm between the mirror 18 and the recording medium 13.

Therefore, to cause a given shift, S, of the footprint, the angle, α, suitably is selected so that:

$$α \simeq NSX/2L_t \quad (7)$$

where: N = the number of interlaced images provided per line.

Equation (7) has been generalized because of an interlacing technique, such as described hereinbelow, may be employed to increase the spatial addressing capacity of the image bar 12, but it will be apparent that it applies equally as well to situations where image interlace is not employed (i.e., N = 1).

Figure 5:
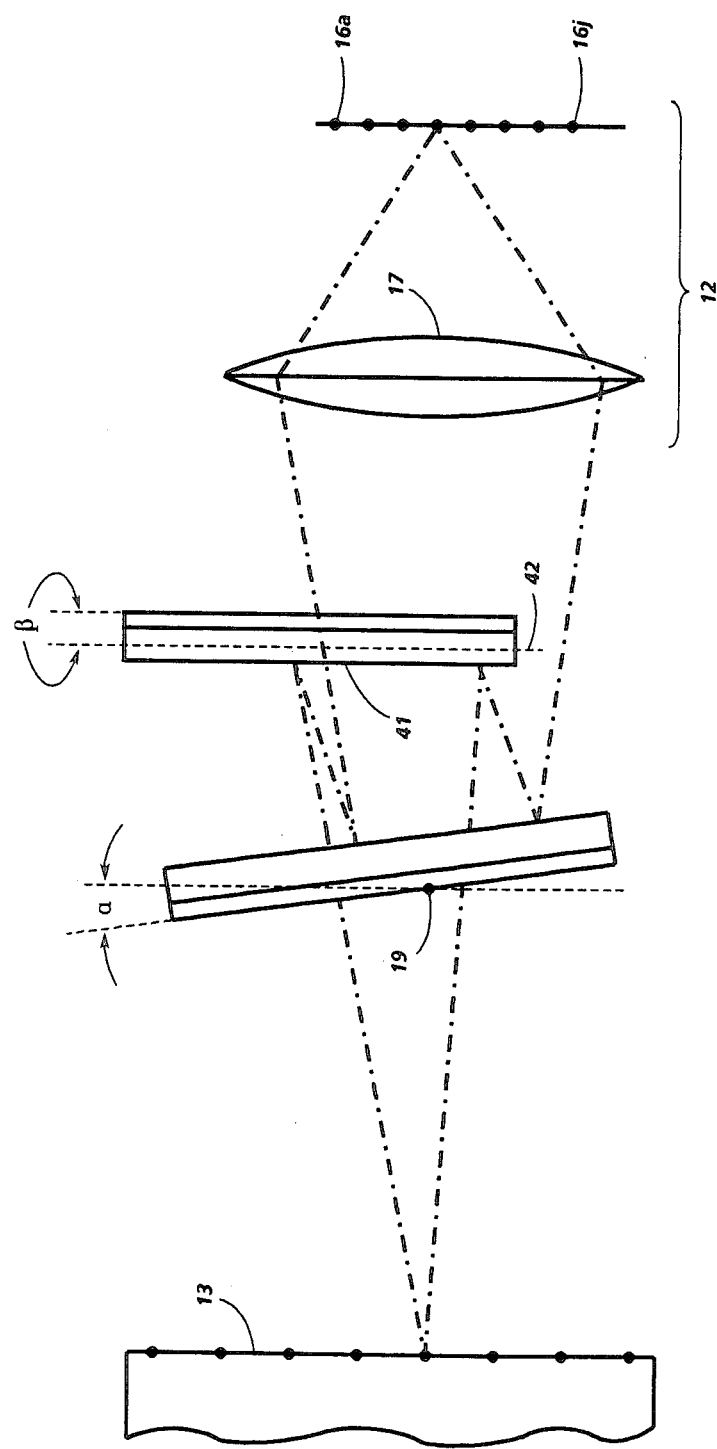
FIG. 5 is a schematic tangential plane view of a sagitally compensated embodiment of the present invention.

Referring to FIGS. 5, it will be seen that provision may be made to compensate for the cross-line motion of the recording medium 13 relative to the image bar 12, thereby reducing or eliminating the sagittal pixel positioning errors which tend to occur when a plurality of successive images, such as the images 32 and 34 (FIG. 3), are incoherently summed to construct a line-like exposure pattern, such as the exposure 36. If the velocity, v, at which the recording medium 13 advances with respect to the recording medium; the rate, r, at which successive images are generated by the image bar 12; and the number of images, m, required per exposure pattern are known; the center-to-center sagittal displacement, Y, between adjacent exposure patterns is given by:

$$Y = mv/r \quad (8)$$

Furthermore, the number, m, of images required per exposure pattern can be expressed as a function of the number, N, of interlaced images provided per line and the number, C, of image compensation steps per interlaced image:

$$m = CN \quad (9)$$

Figure 6:
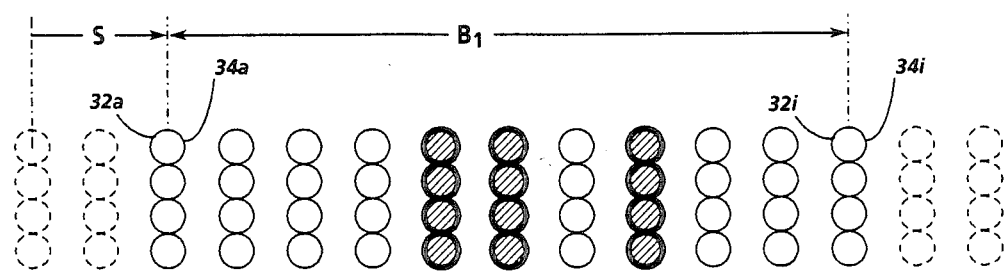
FIG. 6 is a pixel mapping pattern illustrating the effect of the sagittal compensation provided by the embodiment shown in FIG. 5.

Thus, to compensate for the sagittal pixel positioning errors, the footprint of the image bar 12 is sagitally translated with respect to the image bar 12 in timed synchronism with the imaging process to effectively offset the equal but opposite relative sagittal motion of the recording medium 13, thereby more or less stabilizing the footprint of the image bar 12 in a fixed sagittal position on the recording medium 13 while the m steps of the imaging process are being completed. To provide such compensation, as shown in FIG. 6, the sagittal distance, $D_y$, through which the footprint of image bar 12 is counter translated during each exposure cycle is selected so that:

$$D_y = (CN-1)v/r = (m-1)v/r \tag{10}$$

When image interlace is utilized, the sagittal deflection mechanism advantageously is decoupled from the tangential defection mechanism to simplify the implementation of the present invention. As more fully described hereinbelow, this de-coupling enables the tangential deflection mechanism to laterally translate the image bar footprint by different amounts as required for interlace and defect compensation, respectively, without affects the operation of the sagittal deflection mechanism. Accordingly, as illustrated in FIG. 5, a sagittal deflector comprising a second galvo mirror 41 is optically interposed between the tangential defection mirror 18 and the recording medium 13. The mirror 41 is mounted for oscillation about an axis 42 which is essentially normal to the tangential plane, whereby its rotation sagitally deflects the footprint of the image bar 12 with respect to the recording medium 13. The angular rotation required of the mirror 41 for satisfying equation (10) is given to a first approximation by:

$$\beta \approx (CN-1)v/2rL_s = (m-1)v/2rL_s \tag{11}$$

where: $L_s$ = the length of the optical arm between the mirror 41 and the recording medium 13.

Figure 7:
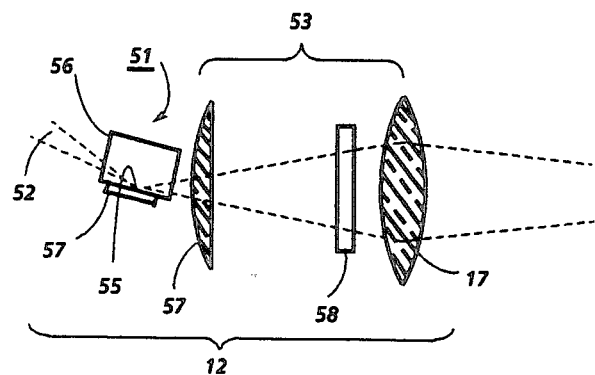
FIG. 7 is a simplified sagittal plane view of an electrooptic image bar.
Figure 8:
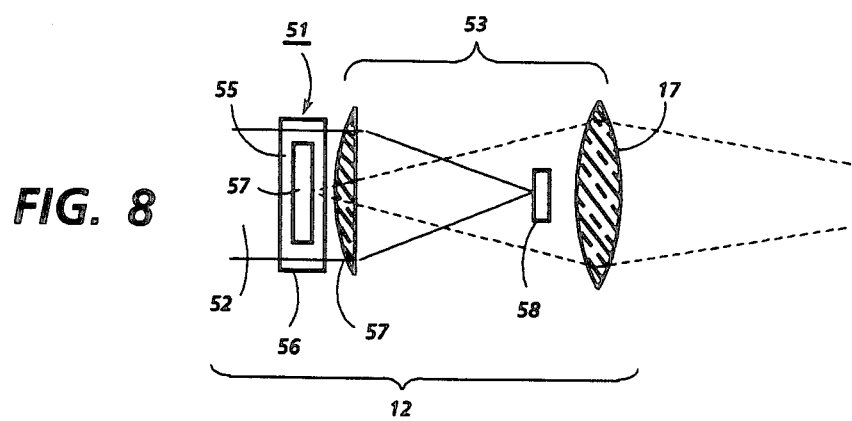
FIG. 8 is a simplified tangential plane view of the image bar shown in FIG. 7.
Figure 9:
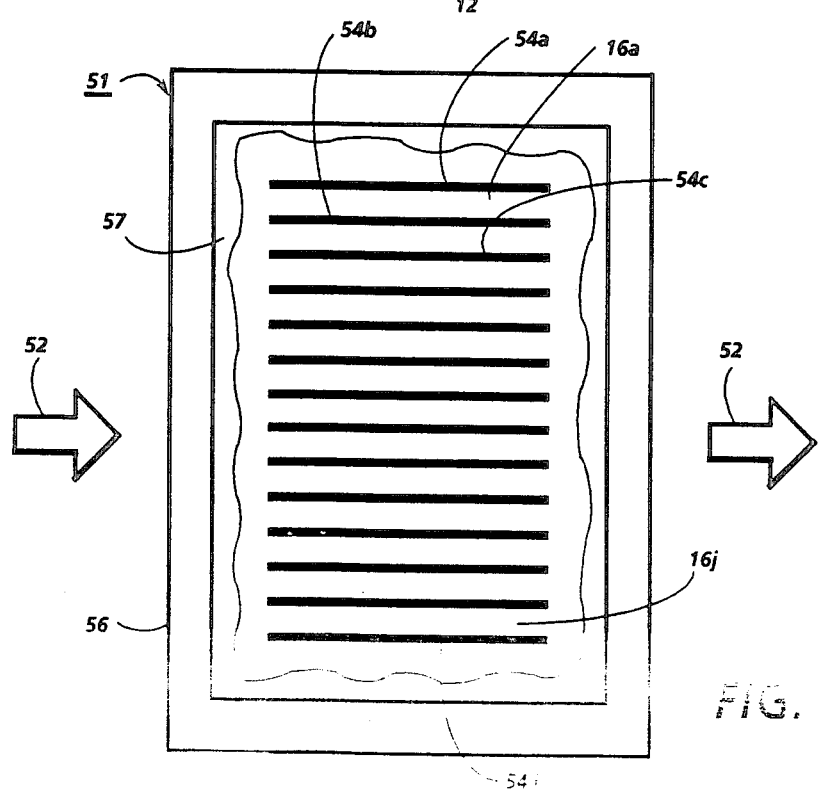
FIG. 9 is an enlarged, partially cut-away and simplified, bottom plan view of the EO TIR spatial light modulator for the image bar shown in FIGS. 6 and 7.

Turning to FIGS. 7-9 for a more detailed description of a preferred image bar 12, it will be seen that there is an EO TIR spatial light modulator 51 for spatially modulating the phase front of a transversely collimated light beam 52, and a Schlieren imaging system 53 for converting the phase modulation of the light beam 52 into a corresponding intensity profile. Briefly reviewing this known EO TIR discrete image bar technology, it will be recalled that the modulator 51 characteristically includes a plurality of mutually parallel, individually addressable electrodes 54a-54j which are supported on or immediately adjacent a longitudinal, reflective surface 55 of an optically transparent electrooptic (EO) element 56. As a general rule, the EO element 56 is a y-cut crystal of LiNbO3 or the like, and the electrodes 54a-54j are longitudinally aligned with the optical axis of the modulator 51. Furthermore, the electrodes 54a-54j are distributed laterally or widthwise of the EO element 56, typically on generally equidistant centers. Advantageously, the electrodes 54a-54j are integrated with their addressing and drive electronics on a VLSI silicon circuit 57. In that event, the EO element 56 and the integrated circuit 57 are assembled so that there is a low electrical loss interface between the electrodes 54a-54j and the reflective surface 55 of the EO element 56.

In operation, the light beam 52 is applied to modulator 51 at a near grazing incidence with respect to the reflective surface 55 of its EO element 56 of the, whereby the beam 52 is totally internally reflected from the surface 55. Typically, provision (not shown) is made for bringing the beam 52 to a wedge-shaped focus on the surface 55, and there is an object/image relationship between the modulator 51 and its output image plane (i.e., the recording medium 13 in FIGS. 1 and 2). The beam 52 illuminates substantially the full width of the EO element 56 and is aligned to propagate axially therethrough.

For modulating the phase front of the light beam 52, differentially encoded data samples are applied to the electrodes 54a-54j. As described in further detail hereinbelow, the data is processed prior to being applied to the modulator 51 to accommodate the defect compensation technique of the present invention. At this point, however, it should be understood that the conventional practice is to differentially encode the data samples on a line-by-line basis, such the value of the first encoded sample for each line of an image is pre-established, thereby providing an initial reference for transforming the values of the raw input data samples for each line into encoded data samples having corresponding sample-to-sample transitional values. Consequently, the value of each raw data sample determines the value of its corresponding encoded data sample relative to the value of the immediately preceding encoded data sample. The electrodes 54a-54j are the pixel control elements, or "pixel generators 16a-16i " (see FIGS. 1 and 2) of the image bar 12, even though each of the electrodes 54a-54j depends on its neighbor because of the differential encoding of the data.

As illustrated the Schlieren imaging system 53 is a central dark field system for suppressing the zero order diffraction components of the modulated light beam 25 while causing its high order diffraction components to come to focus on the recording medium 13 (FIGS. 1 and 2), thereby converting the spatial phase modulation of the light beam 52 into a corresponding intensity profile. To that end, the imaging system 53 comprises a field lens 57 having a stop 58 centrally located in its rear focal plane. The lens 57 collects the modulated light beam 25 as it emerges from the modulator 51 and selectively focuses its zero order diffraction components on the stop 58. However, the propagation angles of the higher order diffraction components cause them to scatter around the stop 38, where they are intercepted by the imaging lens 17 (also see FIGS. 1 and 2) which, in turn, beings them to focus on the recording medium 13.

Figure 10:
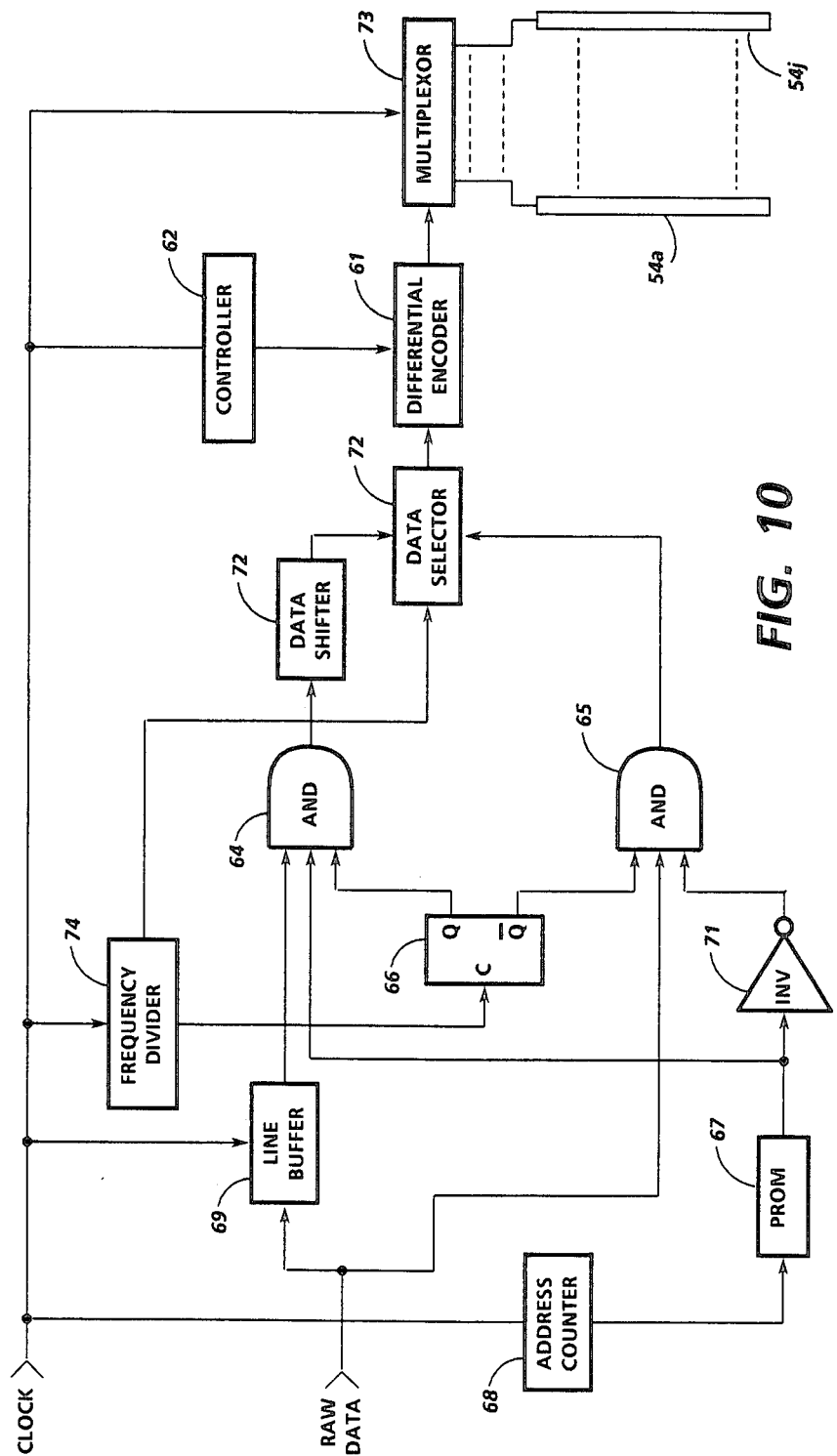
FIG. 10 is a block diagram of a simplified input circuit, including an overwrite suppression feature, for the image bar shown in FIGS. 6–9.

Referring to FIG. 10, in keeping with existing practices, the raw image data samples, D, for the image bar 12 are applied to an encoder 61 which operates under the control of a controller 62 to differentially encode them data at a predetermined clock rate. Moreover, as others have pointed out, an input data buffer (not shown) suitably is employed to supply line length bursts of raw data samples, D, at a sample rate matched to the clock rate. However, the data processing that is performed in accordance with this invention is unique because the raw data samples, D, for each line of the desired output image are logically sorted prior to being applied to the differential encoder 61, thereby separating the samples for the nondefective pixel generators of the image bar 12 from the samples for its defective pixel generators. To that end, in the illustrated embodiment, each line length burst of the input data samples, D, is applied sequentially to a pair of AND gates 64 and 65 which, in turn, are alternately activated and de-activated under the control of a flip-flop 66. A binary bitmap, $B_1$, identifying the relative spatial locations of the defective pixel generators of the image bar 12 is stored in a suitable memory device, such as a programmable read only memory (PROM) 67, and a self-resetting address counter 68 or the like is incremented at the clock rate to serially read out the bitmap cyclically in timed synchronism with the activation and deactivation of the AND gates 64 and 65.

As previously mentioned, differential encoding references the value of each of the encoded data samples to the value assigned to the immediately preceding data sample. That means that each "pixel generator" operationally depends on the voltage values appearing on two adjacent electrodes or, in other words, on the ability to control the voltage drop across the gap between the two adjacent electrodes. Therefore, if adjacent electrodes are shorted together (i.e., if an "interelectrode" short exists), the pixel generators defined by the gaps straddled by those electrodes are "defective". Likewise, if an electrode is open circuited, the pixel generators defined by the gaps adjacent that electrode are "defective".

More particularly, as illustrated in FIG. 10, the raw input data, D, is applied to the AND gate 64 and, via a delay means, such as a line length buffer 69, to the AND gate 65. The input data suitably is shifted through the buffer 69 at the clock rate, thereby delaying its arrival at the AND gate 65 for a period of time sufficient to complete the first step of the imaging process (hereinafter referred to as the "image step period". At the outset of the first step of the imaging process, the flip-flop 66 is set, so its complementary Q and $\bar{Q}$ outputs are at high ("1") and low "0" logic level, respectively, thereby activating the AND gate 64 while deactivating the AND gate 65. The defect map for the image bar 12 is serially read out of the PROM 67 under the control of the address counter 68 which, in turn, is incremented at the clock rate to bit synchronize the read out of the PROM 67 with the input data flow on a pixel generator-by-pixel generator basis. In this instance, the defect map contains high ("1") and low ("0") logic level bits for identifying the defective and non-defective pixel generators of the image bar 12, respectively. Therefore, it is inverted by an inverter 71 before being applied to the AND gate 64, where it is BIT ANDED with the input data samples to supply a line length data string containing the raw data samples for the non-defective pixel generators in their original bit positions, together with disabling bits for the defective pixel generators. A data selector 72 is toggled throughout the first step of the imaging process to feed this data string from the AND gate 64 via the encoder 61 to a multiplexer 73 which ripples the encoded samples onto the non-defective and defective electrodes of the image bar 12 at the clock rate, thereby enabling it to produce a partial image 32 (FIG. 3) for the current line of data.

A frequency divider, such as a ring counter 74, steps down the clock rate to apply a clock toggle pulse to the flip-flop 66 and to the data selector 72 at the conclusion of the first step of the imaging process, thereby initiating a second step during which the flip-flop 66 is reset to deactivate and activate the AND gates 64 and 65, respectively, and the data selector 72 is retoggled to feed data samples from the AND gate 65 to the encoder 61 via a data shifter 75, as more completely described hereinafter. During this second step of the process, the raw data samples, D, for the current line of data and the defect map, B₁, for the image bar 12 are fed in bit synchronism from the buffer 69 and the PROM 67, respectively, to the AND gate 65, so the AND gate 65 BIT AND's them to provide a line length data string comprising the data samples for the defective pixel generators in their original bit positions, together with disabling bits for all of the other pixel generators. For re-mapping this data string onto the image bar 12, the data shifter 75 delays them for S clock periods (as will be recalled, "S" represents the data shift required to re-map this data samples for the defective pixel generators onto non-defective pixel generators) before applying them to the data selector 72 for application to the electrodes 54a–54j via the encoder 61 and the multiplexer 73. At the conclusion of the second step of the imaging process, the counter 74 supplies another toggle pulse for the flip-flop 66 and the data selector 72, thereby conditioning them to repeat the above-described process with the next line of data.

When a two step imaging process is utilized, the defect map, B₁, and its complement, $\bar{B}_1$, for the home position of the image bar 12 are sufficient to prevent overwriting of any previously written pixels because they are complete, mutually exclusive descriptions of the pixel positions upon which pixels are being written. If, however, overwrites are to be inhibited while employing an imaging process involving more than two steps, the defect map for each prior write by the image bar 12 has to be ANDED with the image data, D. As a result, the partial image $i_j$, written during any step, j, of an m-step imaging process, where j=1,2, ... m−1, is given by:

$$I_j = [D \cdot B_1 \cdot \ldots \cdot B_{j-1}] \cdot \bar{B}_j \qquad (12)$$

For the last or final step of the process, j=m, $$I_m = [D \cdot B_1 \cdot \ldots \cdot B_{m-1}] \cdot \bar{B}_m \qquad (13)$$

is identically equal to and may be reduced to:

$$I_m = [D \cdot B_1 \cdot \ldots \cdot B_{m-1}] \qquad (14)$$

because the pretest ensures that no defect will interfere with completing the desired image with the final step. Thus, there is no need to compute, store or process the final term of equation (13). As will be appreciated, the simplification suggested by equation (14) is especially significant for the two step case, because it leads to a substantial simplification of the data processing circuitry. It is, however, valid for any case because in the generalized case represented by equation (12), there is a logical sort of the samples, D, during each step of the write process, whereby any previously unwritten samples which then fall on any of the non-defective pixel generators of the image bar 12 are separated from those which fall on defective pixel generators and from those which have been previously written.

Figure 11:
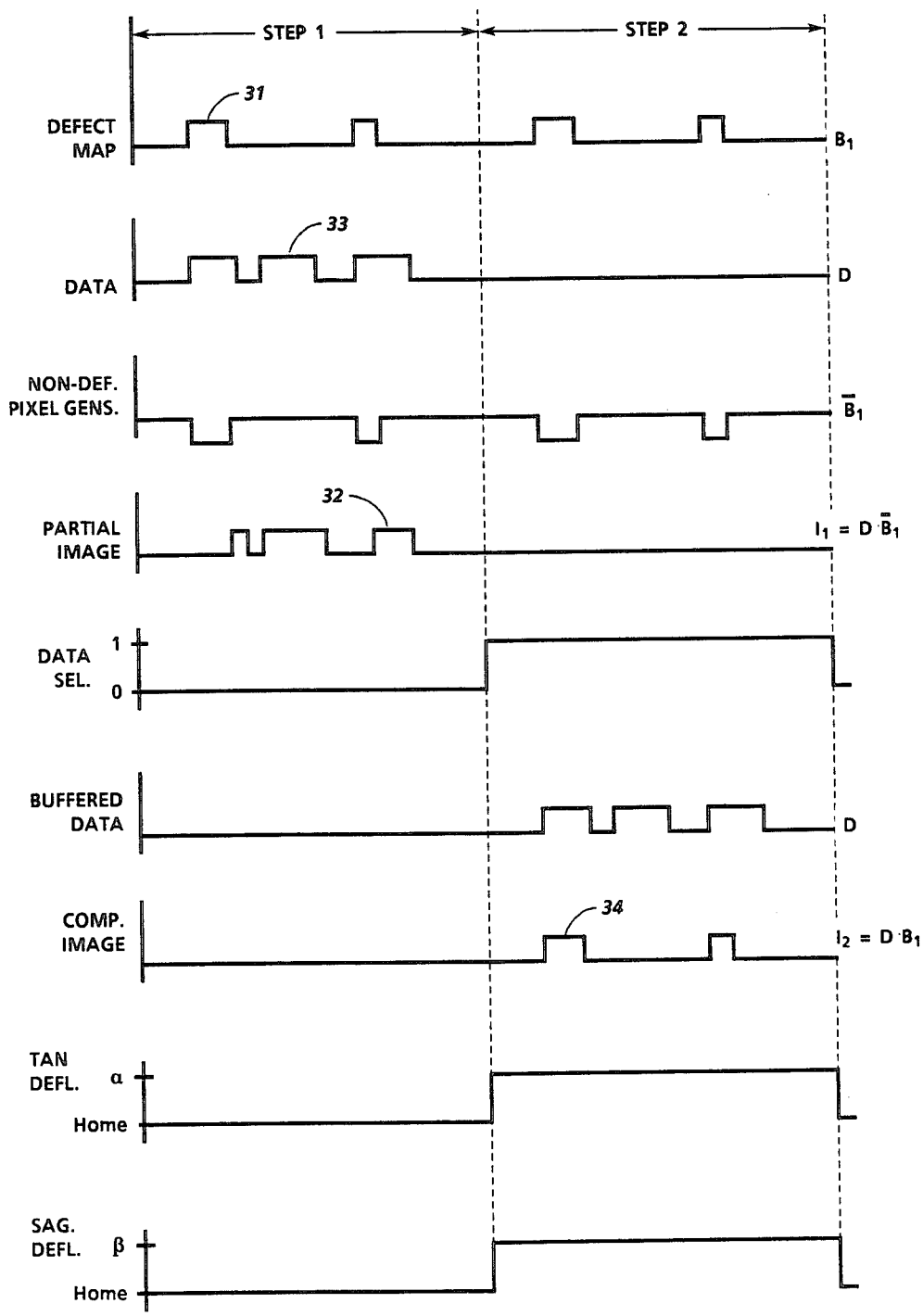
FIG. 11 is a timing diagram for a line printer having a defect compensated, write once image bar constructed in accordance with this invention, together with provision to compensate for the sagittal motion of the recording medium relative to the image bar.

As shown in FIG. 11, the oscillation of the tangential deflection mirror 18 (FIGS. 1, 2 and 5) is synchronized with the steps of the imaging process to tangentially align the compensating image 34 (FIG. 3), which is produced by the image bar 12 during the second step of the above-described two imaging process, with the partial image 32 provided during the first step. Likewise, the oscillation of the sagittal deflection mirror 41 (FIG. 5), if used, is synchronized with the steps of the imaging process to sagittally align the images 32 and 34 with each other.

Figure 12:
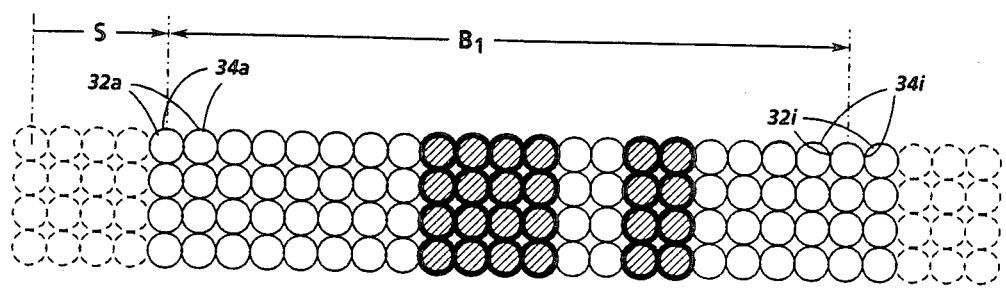
FIG. 12 is a pixel mapping pattern showing the image plane relationship of the pixels generated by a defect compensated, write once image bar operating in an interlace mode with sagittal compensation.

The defection compensation technique of the present invention may be applied to more sophisticated image bars. For example, as illustrated in FIG. 12, it may be utilized in combination with an image interlacing process designed to increase the spatial addressing capacity of the image bar 12. A relatively straightforward and effective technique for increasing the spatial addressing capacity of the above-described differentially encoded EO TIR image bar is to sequentially image the odd and even numbered pixels for each line of the image onto the recording medium 13, thereby causing them to incoherently sum with each other. As pointed out in my aforementioned U.S. patent application Ser. No. 733,354, the differential encoding of the input data for an EO TIR image bar produces interpixel intensity nulls which limit the diameter of the pixels within an image to approximately one-half the center-to-center spacing (i.e., the pitch) of the pixels. Accordingly, the spatial addressing capacity of such an image bar is readily doubled by sequentially imaging the odd and even numbered pixels for each line of the image onto the recording medium 13 with a half pitch tangential offset between the two images.

To interlace odd and even numbered pixels, as shown in FIG. 12, the raw input data for the image bar 12 is applied to a data separator 81 which is toggled at the data rate to separate the odd numbered data samples for each line of the output image from the even numbered samples. The system clock rate suitably is matched to the data rate, so the system clock is fed through a divide by two stage ($\div 2$) to provide a half rate clock which is the functional equivalent to the clock described in conjunction with FIG. 10. The data separator 81 directly routes the odd numbered samples to a data selector 82, but feeds the even numbered samples to the data selector 82 via a line time delay means, such as a half line long buffer 83 which is clocked at the half clock rate. A frequency divider, such as a ring counter 84, divides down the system clock or, as shown, the half rate clock to toggle the data selector 82 at the line time rate, thereby causing the data selector 82 to switch at that rate to feed first all of the odd numbered pixels and then all of the even numbered pixels to the AND gate 64 and the buffer 69. From that point on the data processing is essentially the same as previously described with reference to FIG. 10, so like reference numerals have been used to identify like parts. It should, however, be understood that the step rate of the imaging process is twice as fast if the half clock rate of FIG. 12 is selected to equal the clock rate of FIG. 10, but there are twice as many steps to the imaging process due to the sequential imaging of the odd and even numbered pixels. The divider 74 is still a line length ring counter or the like, but it toggles the flip-flop 66 and the data selector 72 on every other imaging step because it is driven at the half clock rate.

Figure 13:
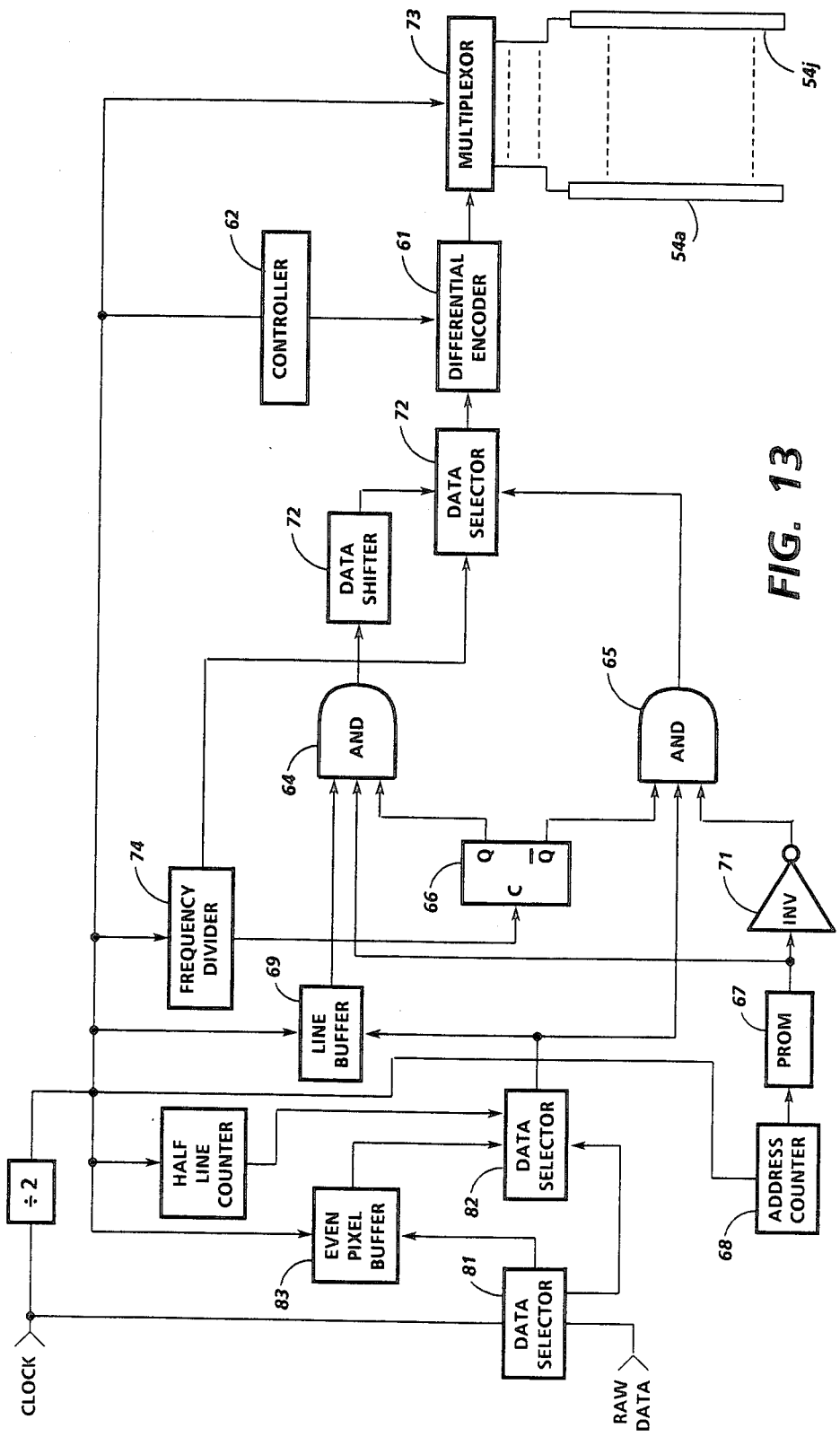
FIG. 13 is a block diagram of an input circuit for providing defect compensation in accordance with this invention while operating the image bar shown in FIGS. 7–9 in an interlace mode.

FIG. 13 illustrates the synchronous timing that is maintained when the input data is processed in accordance with FIG. 12 to provide defect compensation for a sagittally compensated image bar, such as shown in Fig. 5, which is operated to interlace odd and even numbered pixels. As will be seen, the tangential deflection provided by the mirror 18 is controlled so that the partial images for the odd and even numbered pixel patterns are first sequentially written with a half pitch tangential offset between them and then the defects in those images are sequentially overwritten after remapping the data for the missing pixels onto non-defective electrodes of the image bar 12 and equally and oppositely countershifting the footprint of the image bar 12 as previously described.

CONCLUSION

In view of the foregoing, it will now be understood that the present invention provides methods and means for compensating for defective pixel generators of image bars. Moreover, it will be apparent that this defect compensation technique may be applied to image bars which utilize image interlace to increase their spatial addressing capacity. Still further, it will be appreciated that sagittal compensation may be provided for defect compensated image bars embodying this invention.

What is claimed:

1. In an image recorder including an image bar having a plurality of spatially distributed, substantially independently addressable pixel generators for sequentially recording spatial patterns on a recording medium in response to successive data sample sets representing said patterns, said image bar casting a footprint of predetermined size onto said recording medium, the improvement comprising means for storing a description of said image bar, said description distinguishing between non-defective and defective pixel generators of said image bar whenever any of said pixel generators have been found to be defective;

means for processing each of said sample sets in accordance with said description to insert (i) the data samples that are positioned to address nondefective pixel generators into corresponding positions within one data string and (ii) the data samples that are positioned to address said defective pixel generators into corresponding positions within at least one other data string; said data sample sets and said data strings being of equal length, with each of said data strings comprising null data elements in all positions other than those into which data samples are inserted;

means for specifically applying said data strings to said image bar, with each of said other data strings being shifted a predetermined amount in a predetermined direction with respect to said image bar prior to being applied thereto, thereby re-positioning the data samples therein to address non-defective pixel generators of said image bar, and means coupled to said image bar for equally countershifting its footprint with respect to said recording medium while each of said other data strings are being applied to said image bar, thereby substantially restoring the data samples within said other data sample sets to their original positions with respect to said recording medium, whereby each of said spatial patterns is relatively faithfully recorded as a corresponding pixel pattern on said recording medium, even if said image bar has defective pixel generators.

2. The improvement of claim 1 further including
    means for moving said recording medium in a sagittal direction relative to said image bar as a function of time, and
    sagittal compensation means coupled to said image bar for substantially stabilizing the footprint of said image bar sagittally with respect to said recording medium while each of said spatial patterns is being recorded.

3. The improvement of claim 2 wherein
    said image bar is an optical image bar, and
    said sagittal compensation means includes an optical deflector for optically deflecting the footprint of said image bar by an amount selected to substantially compensate for the relative sagittal motion of said recording medium.

4. The improvement of claim 1 wherein
the data strings into which the data samples for each of said pixel patterns are sorted are mutually exclusive of each other, whereby pixel overwrites are inhibited.

5. The improvement of claim 4 wherein
said image bar casts a pagewidth footprint on said recording medium for recording line length spatial patterns thereon, and
said processing means sorts the data samples of each of said sample sets into said one data string or into a single other data string depending upon whether said data samples are positioned to address non-defective or defective pixel generators, respectively, of said image bar.

6. The improvement of claim 5 wherein
said description of said image bar is a binary bit map having bits of opposite logic levels for distinguishing between the non-defective and defective pixel generators of said image bar, and
said processing means includes means for BIT ANDING said bit map with each of said sample sets to logically sort the samples that are positioned to address said non-defective pixel generators into said one data string and the samples that are positioned to address said defective pixel generators into said other data string.

7. The improvement of claim 6 wherein
said image bar comprises an EO TIR spatial light modulator having a plurality of individually addressable electrodes adjacent a reflective surface of an electrooptic element, whereby said pixel generators are controlled by voltages appearing across neighboring pairs of said electrodes, and
said recorder further includes means for differentially encoding said data strings, thereby providing differentially encoded data for application to said electrodes.

8. The improvement of claim 7 further including
means for moving said recording medium in a sagittal direction with respect to said image bar, and
optical means disposed between said image bar and said recording medium for imaging said modulator onto said recording medium to define said footprint, said optical means comprising deflector means for substantially stabilizing the image of said image bar sagittally with respect to said recording medium while each of said spatial patterns is being recorded.

9. The improvement of claim 1 wherein
each of said spatial patterns is represented by a plurality of mutually exclusive data sample sets which are sequentially applied to said image bar, and
said image recorder further includes means for shifting said image bar tangentially with respect to said recording medium for recording said mutually exclusive sample sets on tangentially interlaced centers.

10. The improvement of claim 9 further including
means for moving said recording medium in a sagittal direction with respect to said image bar as a function of time, and
sagittal compensating means coupled to said image bar for maintaining a substantially stabilizing the footprint of said image bar sagittally with respect to said recording medium while each of said spatial patterns is being recorded.

11. The improvement of claim 10 wherein
said image bar is an optical image bar which is imaged onto said recording medium to define said footprint, and
said sagittal compensating means is an optical deflector for deflecting the image of said image bar in a direction and by an amount selected to maintain said image in a substantially constant sagittal position on said recording medium while each of said spatial patterns is being recorded.

12. The improvement of claim 9 wherein
each of said spatial patterns is represented by a pair of mutually exclusive sample sets, one of which contains odd numbered samples and the other of which contains even numbered samples.

13. The improvement of claim 9 wherein
said description of said image bar is a binary bit map having bits of opposite logic levels for distinguishing between the non-defective and defective pixel generators of said image bar, and
said processing means includes means for BIT ANDING a selected portion of said bit map with each of the sample sets for each of said spatial patterns to logically sort the samples that are positioned to address said nondefective pixel generators into said one data string and the samples that are positioned to address said defective pixel generators into another data string.

14. The improvement of claim 13 wherein
said image bar includes an EO TIR spatial light modulator having a plurality of individually addressable electrodes adjacent a reflective surface of an electrooptic element for spatially modulating a light beam in accordance with said data strings, and Schlieren imaging optics disposed between said modulator and said recording medium for imaging said modulator onto said recording medium.

15. The improvement of claim 14 wherein
said data recorder further includes differential encoding means coupled between said processing means and the electrodes of said modulator for differentially encoding said data strings prior to applying them to said electrodes.

16. The improvement of claim 15 wherein
the image of said modulator fills a pagewidth address field on said recording medium, thereby enabling said image bar to perform line printing.

17. The improvement of claim 16 wherein
each of said spatial patterns is represented by a pair of mutually exclusive sample sets, one of which contains odd numbered samples and the other of which contains even numbered samples, and
said odd and even numbered samples are represented by pixels of predetermined diameter which are recorded on said recording medium on tangentially interlaced centers, with the center-to-center spacing of said interlaced pixels being approximately equal to the diameter of said pixels.

* * * * *